United States Patent
Tang et al.

(10) Patent No.: US 7,543,298 B1
(45) Date of Patent: Jun. 2, 2009

(54) SYSTEMS AND METHODS FOR UPDATING EMS CLASS OBJECT REFERENCES

(75) Inventors: Harry Tang, Atlanta, GA (US); Sony Antony, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1135 days.

(21) Appl. No.: 10/259,617

(22) Filed: Sep. 30, 2002

Related U.S. Application Data

(63) Continuation-in-part of application No. 10/259,732, filed on Sep. 30, 2002, now Pat. No. 7,246,354.

(51) Int. Cl.
*G06F 3/00* (2006.01)

(52) U.S. Cl. .................................... 719/310

(58) Field of Classification Search ................ 719/310, 719/318; 370/254
See application file for complete search history.

(56) References Cited

U.S. PATENT DOCUMENTS

| | | | |
|---|---|---|---|
| 5,768,119 A | 6/1998 | Havekost et al. | |
| 5,796,393 A * | 8/1998 | MacNaughton et al. | 715/733 |
| 5,958,010 A | 9/1999 | Agarwal et al. | |
| 6,052,722 A | 4/2000 | Taghadoss | |
| 6,161,136 A | 12/2000 | Hyndman | |
| 6,260,062 B1 * | 7/2001 | Davis et al. | 709/223 |
| 6,324,587 B1 * | 11/2001 | Trenbeath et al. | 719/310 |
| 6,349,335 B1 | 2/2002 | Jenney | |
| 6,363,421 B2 | 3/2002 | Barker | |
| 6,424,872 B1 | 7/2002 | Glanzer et al. | |
| 6,505,244 B1 | 1/2003 | Natarajan et al. | |
| 6,564,341 B1 * | 5/2003 | Sundaram et al. | 714/43 |
| 6,714,976 B1 | 3/2004 | Wilson et al. | |
| 6,901,440 B1 | 5/2005 | Bimm et al. | |
| 6,950,935 B1 * | 9/2005 | Allavarpu et al. | 713/168 |
| 6,968,553 B1 | 11/2005 | Theeten | |
| 6,970,919 B1 * | 11/2005 | Doi et al. | 709/220 |
| 7,010,586 B1 * | 3/2006 | Allavarpu et al. | 709/223 |
| 7,020,707 B2 | 3/2006 | Sternagle | |
| 7,062,549 B1 | 6/2006 | Miller et al. | |
| 7,191,228 B1 | 3/2007 | Antony | |
| 7,246,354 B1 | 7/2007 | Antony | |
| 2002/0156930 A1 * | 10/2002 | Velasquez | 709/310 |
| 2003/0055946 A1 | 3/2003 | Amemiya | |
| 2003/0084129 A1 | 5/2003 | Nakamura | |
| 2007/0127435 A1 | 6/2007 | Antony | |

OTHER PUBLICATIONS

Technical Report, Protocol Independent Object Model for ADSL EMS-NMS Interface, Mar. 2000.*

* cited by examiner

*Primary Examiner*—Li B Zhen
*Assistant Examiner*—LeChi Truong
(74) *Attorney, Agent, or Firm*—Withers & Keys, LLC

(57) ABSTRACT

A system and method is described for updating EMS class object references within a database of an NMS when a change is made in the EMS or a component within a system architecture. Such updating of NMS database occurs in real time by continuously requesting information relating to any such update from a naming administrator.

15 Claims, 5 Drawing Sheets

SYSTEMS AND METHODS FOR UPDATING EMS CLASS OBJECT REFERENCES

This application is a continuation-in-part of U.S. patent application Ser. No. 10/259,732; titled "NMS CORBA Listener for EMS Signals", filed Sep. 30, 2002, now U.S. Pat. No. 7,246,354 which is incorporated by reference herein in its entirety.

BACKGROUND

1. Field of the Invention

The present invention relates to systems and methods for maintaining the proper informational status of system architecture under control of an NMS. More particularly, the present invention relates to systems and methods for maintaining and updating the informational status of components within an electronic architecture by keeping track of EMS class object references relating to the components in "real time".

2. Background of the Invention

In the increasingly sophisticated field of electronic communication, particularly between electronic systems or machines, the TL-1 line protocol has remained a common industry standard. TL-1 lines are used as a communication medium between different electronic systems or machines, particularly in Internet—and telecommunication—related systems. However, TL-1 commands are typically very specific and limited to the type of systems or machines that utilize such lines. For example, each distinct system component may require its own unique TL-1 commands or inputs that take into account the specifics of the particular component.

Such a need for detailed characteristics makes use of TL-1 commands generally complicated and time-consuming. Further, TL-1 commands used by different system components make it difficult for the components to communicate with one another, even though all use the general TL-1 command protocol. Finally, much detail is required to determine the specific programming characteristics of each hardware component that is being connected with a given TL-1 line. Thus, although ubiquitously used, TL-1 lines have a number of limiting characteristics.

One of the most limiting characteristics of a TL-1 line is that it does not allow for efficient communication between interconnected hardware. For example, if a change is made in a downstream component of an electronic system, it would be very difficult for an upstream component to receive "real-time" information about that specific downstream change. Typically, when a downstream change is currently made to, for example, a component of a system, such change is communicated to an upstream programmer by the person who has made such a change in the downstream component. Such a requirement for the person who creates changes to communicate them "manually" to upstream programmers is inefficient and prone to errors, such as when the person forgets to relay such information to upstream programmers.

As a further non-limiting example, if an electronic switch or card is changed in a downstream component of an electronic network, TL-1 lines connecting the series of network components to an upstream programmer would not efficiently allow the programmer to be cognizant of the change. Such a programmer may receive some indication that a change was made in that specific downstream component if the programmer sends a specific command related to that changed component and the component responds, because of the change, in a way that the programmer was not expecting. This conventional "reactive" method of determining changes downstream is inefficient and prone to errors, particularly when the upstream programmer is not aware of the downstream changes.

Further, in order to effectively communicate with components under the control of a given EMS, an upstream NMS needs to create and store unique EMS class object references that relate to each component under the control of the particular EMS. Each such unique EMS class object reference identifies a specific component within an electronic architecture. When there is an upgrade in EMS or an update in EMS based upon any of the components within the EMS control, such unique EMS class object references will also change. If NMS is not made aware of such changes in unique EMS class object references in its memory, NMS will not be able to communicate to EMS with commands relating to the components of interest whose EMS class object references should have been updated in NMS memory.

Thus, there is a need for systems or methods that automatically update the status of a system architecture as it changes in "real time" in an effective and efficient manner. Additionally, there is a further need for a central processing center to receive all the information from downstream components, and to reform the information into a universal language that is understandable by an upstream component. To that end, there is a need for an automated process that keeps track of any system component changes that have occurred, including system component upgrades and name changes, and relays information relating to EMS class object reference updates to upstream NMS in real time.

SUMMARY OF THE INVENTION

In exemplary embodiments of the present invention, systems and methods are presented that keep track of and update a system map in an upstream NMS of a given electronic architecture downstream of the NMS in "real time". Such electronic architectures include a listening process that enables an upstream component, such as, for example, a "notification listener", to become aware of downstream changes in network architecture. As a non-limiting example, an EMS class object reference tracker process electronically memorizes the communication structure and pathways of system components, and is informed of downstream changes in machinery or system configurations when such changes occur as close to "real time" as possible by, for example, constantly inquiring about such changes through a naming service. In other words, the NMS memory structure maintains an "up to the minute" structural tree that reflects a true map of system architecture that is in communication with the NMS. Maintaining such a real time EMS class object reference tree may entail, for example, periodically inquiring from a naming service whether each of the components in an architecture is still present within the architecture or whether any of the components have had an upgrade, replacement, or name changes.

In one exemplary embodiment of the present invention, a system is disclosed for maintaining a real time mapping of an electronic system architecture within an NMS database. The system includes a component within an electronic architecture with a given identifier, the component having been changed or upgraded reflecting a new identifier, a naming administrator that receives a notification of the new identifier, a listener process that periodically requests and automatically receives information relating to the new identifier from the naming administrator, and an NMS in communication with the listener process and which receives the information relating to the new identifier and stores such information within a database that is a mapping of the electronic architecture.

In another exemplary embodiment of the present invention, a system is disclosed for maintaining a mapping of an electronic architecture under control of an NMS in a database memory of the NMS. The system includes a component under control of an EMS, the component having a unique identifier, a naming administrator in communication with the EMS, wherein the naming administrator is updated with any changes in the unique identifier, a listener process that receives information from the naming administrator relating to any changes in the unique identifier, wherein the listener process translates the information into a format that is understandable by an NMS, and an NMS that receives translated information from the listener process relating to changes in the unique identifier of the component, and reflects such changes in its information database.

In yet another exemplary embodiment of the present invention, a system is disclosed for maintaining a mapping of an electronic architecture under control of an NMS in a database memory of the NMS. The system includes a component under control of an EMS, the component having a unique identifier, means for naming in communication with the EMS, wherein the means for naming is updated with any changes in the unique identifier, means for listening that receives information from the means for naming relating to any changes in the unique identifier, wherein the means for listening translates the information into a format that is understandable by an NMS, and an NMS that receives translated information from the means for listening relating to changes in the unique identifier of the component, and reflects such changes in its information database.

In another exemplary embodiment of the present invention, a method is disclosed for updating new component identifiers in an electronic architecture within a database of an NMS controlling the component. The method includes conveying information relating to the new identifier to a naming administrator, receiving and translating the information relating to the new identifier into a format recognizable by the NMS, transmitting the translated information to the NMS, and storing the translated information within the database of the NMS.

DETAILED DESCRIPTION OF PREFERRED EMBODIMENTS

The systems and methods according to the present invention utilize a universal interface between machines to enable better communication in either direction. Such a universal interface may be, for example, CORBA, which will be described in more detail below. However, the present invention is not limited to CORBA and may use any other type of universal interface that facilitates communication between two or more machines in electronic communication. Other possible languages and technologies include, but are not limited to, RPC, RMI, and COM.

Figure 1:
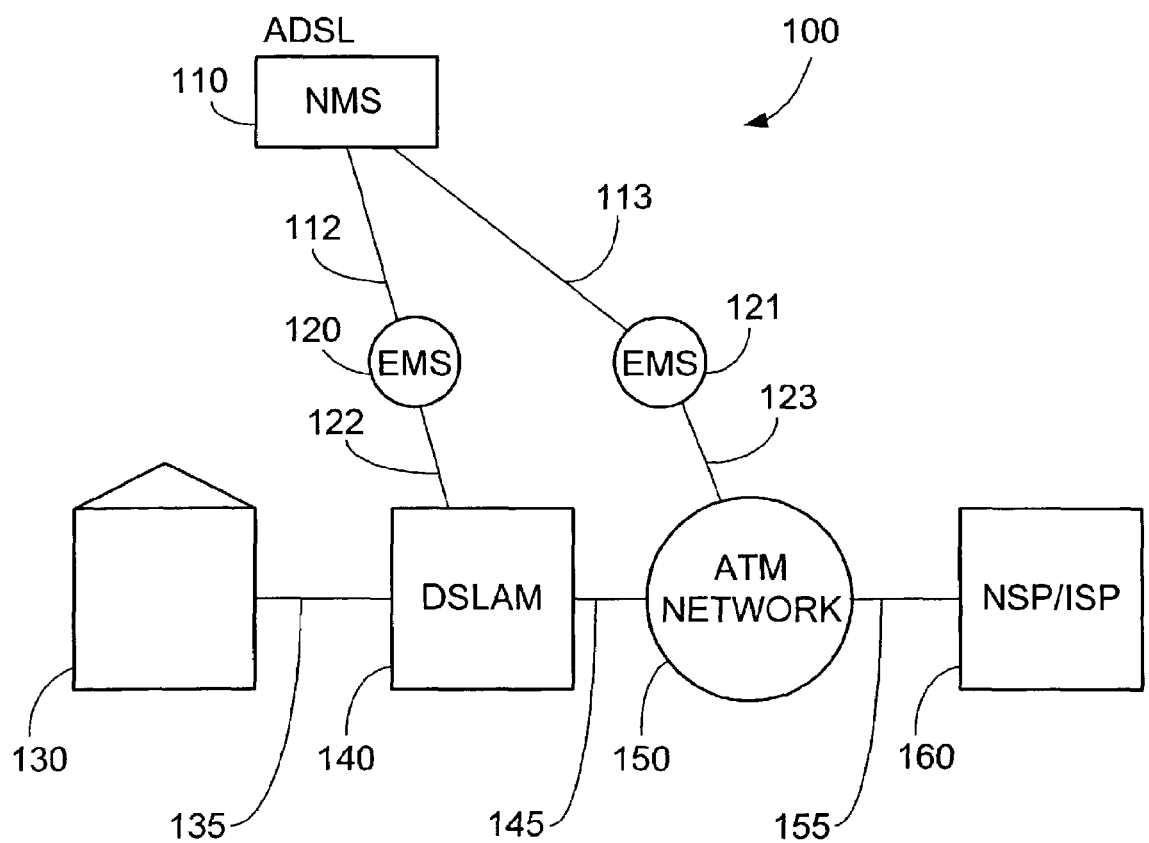
FIG. 1 shows an exemplary embodiment of an ADSL system architecture in which an NMS tests or controls various components of the system through one or more EMS.

Showing an exemplary embodiment graphically as system 100 in FIG. 1, a network management system ("NMS") 110 communicates with one or more electronic management systems ("EMS") 120 and 121 through telecommunication pathways 112 and 113, respectively. Telecommunication pathways 112, 113 and others shown here and throughout this disclosure may be any common type of electronic communication medium that connects two electronic machines, unless otherwise indicated.

A given NMS may be, for example, a telecommunications company, and may have hundreds of EMS connecting to it. The NMS 110 shown in FIG. 1 may be part of an asymmetric digital subscriber line ("ADSL") operated by, for example, a telephone or telecommunications company. Each EMS 120 and 121 has control of one or more systems or machines in communication with it. For example, EMS 120 is in communication and in control of digital subscriber line access multiplexer ("DSLAM") 140. Similarly, EMS 121 is in communication and in control of asynchronous transfer mode network 150 ("ATM NETWORK").

In exemplary system 100 shown in FIG. 1, a given user, such as a user in home 130, is in communication with DSLAM 140 through communication pathway 135. Also, DSLAM 140 is in communication with ATM NETWORK 150 through communication pathway 145. Finally, ATM NETWORK 150 is in communication with a network service provider or Internet service provider ("NSP/ISP") 160 through communication pathway 155.

A programmer using the NMS 110 system may evaluate the conditions of the downstream components DSLAM 140 and ATM NETWORK 150 through use of EMS 120 and 121, respectively. Furthermore, the proper operation of NSP/ISP 160 may also be evaluated by EMS 120 or 121. For example, to evaluate the condition of DSLAM 140, a programmer may send a signal through NMS 110 that is transmitted along communication pathway 112 to EMS 120, and along communication pathway 122 to DSLAM 140 to evaluate its condition. If DSLAM 140 is not operating properly, the return signal from DSLAM 140 back to NMS 110 may indicate a malfunction. In a similar fashion, NMS 110 may determine the proper function of ATM NETWORK 150 using EMS 121 through communication pathways 113 and 123.

Any anomalies in any component of the system 100 may be determined by NMS 110 and subsequent changes and repairs may be made. Although such a system 100 is typically effective in testing for proper operation of system components, it is "reactive" to changes that have already been made in the system. Further, system 100 does not detect a change when the change occurs but after a test signal is sent out, and is thus not "proactive" in considering such changes as they occur, for example, in "real time".

The exemplary embodiment of a reactive system 100 shown in FIG. 1 is merely one type of many possible types of reactive, synchronous systems. A more generic explanation of reactive and proactive systems is now provided for understanding the advantages realized from utilizing a proactive system, in accordance with the present invention.

Figure 2:
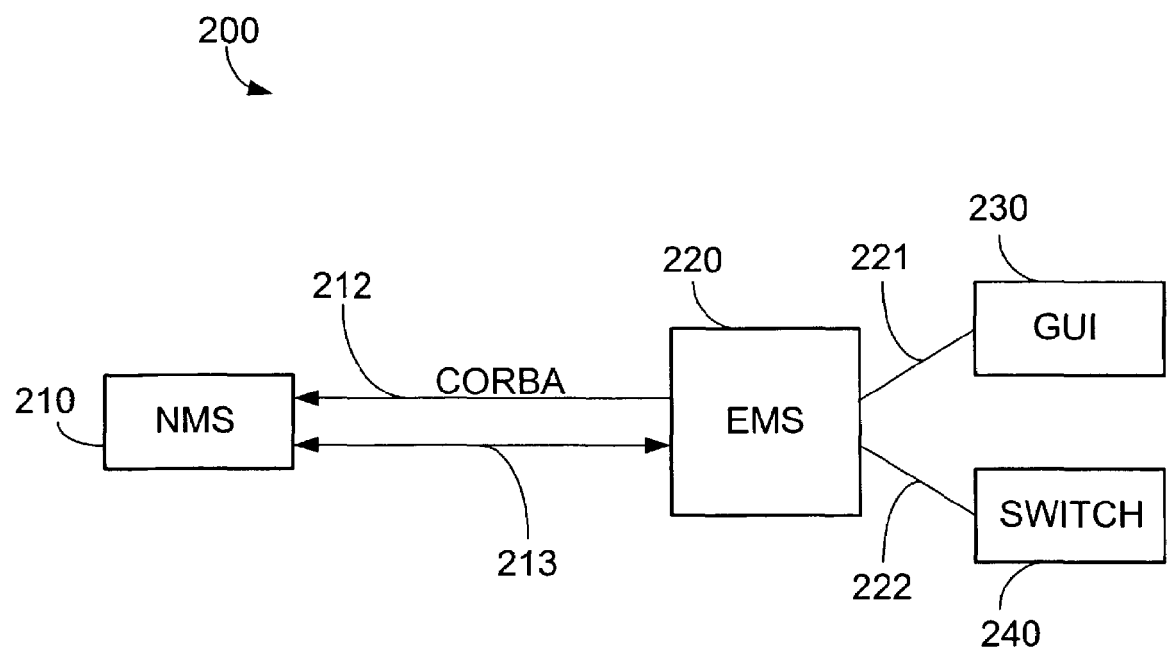
FIG. 2 shows an exemplary embodiment of a system with an NMS in communication with an EMS through several communication pathways that enable information transmission between the EMS and NMS.

A more generic example of a system having both reactive configurations, as is common in conventional systems, and proactive configurations, with exemplary embodiments of the systems or methods of the present invention shown herein, is shown as system 200 in FIG. 2. In this system 200, an NMS 210 is in communication with one or more EMS 220 through exemplary communication pathways 212 and 213. EMS 220 is also in communication through communication pathway 221 with one or more graphic user interfaces ("GUI") 230, which allow control and testing of EMS 220. Further, one or more switches 240 may also be in communication with EMS 220 through communication pathway 222.

Communication pathways 212 and 213, although they both connect NMS 210 with EMS 220, operate in different ways and therefore have different capabilities. Communication pathway 213 is based on open system interconnection ("OSI") or CORBA communications protocol and is conventionally used as a two-way communication path. For example, when a signal is sent by NMS 210 to verify the operation of a downstream switch 240, the signal travels along communication pathway 213 to EMS 220, through communication pathway 222, and to switch 240. When the status of switch 240 is determined, then a signal is sent back through communication pathway 222 to EMS 220, and then through communication pathway 213, back to NMS 210. Thus, communication pathway 213 may operate in both directions, NMS 210 to EMS 220 and EMS 220 to NMS 210, and is thereby termed "synchronous" to indicate that for a given signal that is projected from NMS 210, a corresponding return signal is returned to the NMS 210 that corresponds to, or is "in sync" with, the original NMS 210 signal.

Some of the limitations of utilizing only communication pathway 213 in system 200 become evident when a programmer changes a component or operation of the system 200 downstream of NMS 210. For example, if a programmer using GUI 230 changes a function or operation of EMS 220, for example, by changing a card stored within EMS 220, such change is not registered into NMS 210 automatically. Usually, the programmer who affected such a change downstream in system 200 contacts an operator of NMS 210 and informs the operator of the change, thereby enabling the operator to make such a change in the configurations of NMS 210 to reflect the downstream change. This requirement of the programmer downstream having to communicate "manually" any changes in the downstream component of system 200 with an operator of NMS 210 to note such changes in NMS 210 configuration upstream is both inefficient and unreliable. If, for example, the programmer fails to make the operator of NMS 210 aware of the changes, then NMS 210 is not changed to reflect the true downstream architecture, and errors could result during operation of NMS 210.

Alternatively, an operator of NMS 210 may be able to detect changes in the system 200 that have occurred downstream of NMS 210 if while a synchronous command operation through communication pathway 213, a return message is received that is unexpected or specifically indicates that a certain operation is not possible because a certain downstream component is not in operation or has been changed. Although such reactive information gathering sometimes may be helpful in understanding what downstream changes have been made, it is inefficient and may result in wasted resources if such downstream changes are difficult to detect immediately. An operator of NMS 210 who notes that certain changes may have been made in the system without notification of NMS 210, may not be able to discern what those changes were, and may have to spend wasted time and resources in determining such changes.

Thus, a need exists to efficiently and effectively communicate any downstream changes in an exemplary system 200 with the upstream NMS 210 to allow NMS memory architecture and design to be updated to reflect the true architecture of the system 200. Communication pathway 212 may be used for such an "asynchronous" system that communicates upstream any changes that have been made downstream, in near "real time". Thus such an exemplary asynchronous pathway 212 may be one directional, from downstream to upstream, and is activated upon effecting a change in the system architecture anywhere in system 200 downstream of NMS 210.

Using the same scenario described above with respect to FIG. 2 but with an "asynchronous" reaction system, if the same switch 240 is changed downstream in system 200, NMS 210 will be alerted to this change automatically by a notification message that traverses upstream through EMS 220 and through communication pathway 212 into NMS 210. To make such asynchronous messaging strategies effective and efficient, a "CORBA" interface is used in conjunction with communication pathway 212 to enable efficient and rapid inter-machine communication possible.

This "CORBA" is an alternative to the TL-1 protocol and stands for common object request broker architecture. CORBA is object-oriented, which means that the language or commands are structured in such a manner such that many machine interfaces may use it and thereby communicate effectively with each other. Thus, CORBA has the potential to unify the languages used by different electronic systems and machines into a single command language that is understandable by many different systems. A variety of systems, such as, for example, UNIX, SOLARIS, WINDOWS, DOS, and embedded systems, may support CORBA commands. Thus, CORBA may be universally supported by different computer systems that previously were not able to communicate with each other effectively.

Use of a universal command language and interface, such as CORBA, decreases time requirements for personnel, such as, for example, programmers, controllers, engineers, and technicians, who previously had to concern themselves with much detail of each new machine that was to be communicated with each existing system into the specifics of the language required by each machine. For example, when connecting a new machine to an existing system using a conventional communication line, such as for example, a TL-1 or similar line, the specific characteristics of the new machine must be considered in constructing a TL-1 command language that enables the new machine to communicate with the existing system. Such a stringent requirement is not necessary when using CORBA interface such that with CORBA, the machines are, for example, only instructed about what functions they are to perform, rather than having to the consider the specifics of the machine.

Figure 3:
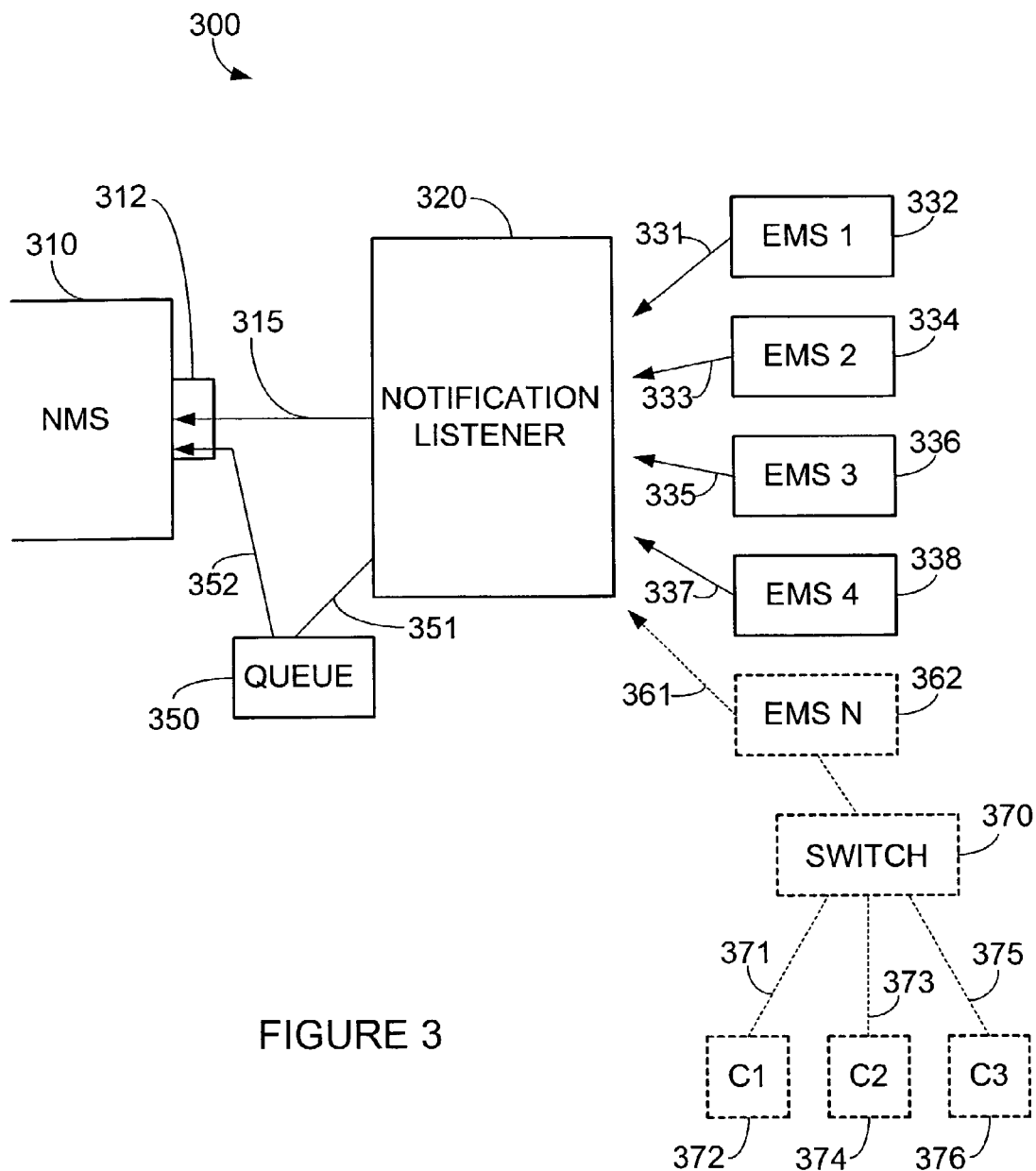
FIG. 3 shows an exemplary embodiment of a system that includes a notification listener that receives notification signals from one or more downstream EMS and transmits such signals onto an upstream NMS.

Having considered a universal interface language, such as, for example, CORBA, as the operating language of such an asynchronous notification system, another exemplary embodiment of such a system 300 is shown in FIG. 3. In system 300, an NMS 310 is located upstream in system 300 and thereby has control over the operations of the system. One or more EMS 332, 334, 336, 338, and 362 are in communication with NMS 310 through one or more communication pathways 331, 333, 335, 337, and 361, respectively.

Each such EMS 332, 334, 336, 338, and 362 may also be in communication and/or in control of one or more switches. Such additional switches and downstream components are not shown in this figure for sake of simplicity. A single exemplary switch 370 in communication with EMS 362 is shown as an example. However, each EMS, such as EMS 362, may be in communication with one or more switches or other components (not shown for sake of simplicity).

Each switch, such as, for example, switch 370, may control a given function of one or more customers 372, 374, and 376 through communication pathways 371, 373, and 375, respectively. Thus, a given NMS 310 may have control over countless components downstream, including, for example, EMS 332, 334, 336, 338, and 362, switch 370, and customers 372, 374, and 376.

In order to keep track of all such changes to the downstream components of system 300, NMS 310 may use a notification listener 320 that receives all signals of change from downstream components, translates each signal into an understandable universal format through CORBA interface, aggregates all such changes into a common nucleus, and forwards such change notifications in translated form to NMS 310. Notification listener 320 acts as a "central processing station" that receives, translates, aggregates, and filters incoming signals. Further, notification listener 320 is extensible and may expand to accommodate additional numbers of EMS inputs and other components.

Upon processing incoming notification messages from various EMS 332, 334, 336, 338, and 362, notification listener 320 unravels the message, and determines which component sent the message and what the message is. Then, notification listener 320 re-presents the information in a fashion that is more easily understandable by upstream NMS 310, and forwards the processed and translated messages to NMS 310 through communication pathway 315. Optionally, before the forwarded message reaches NMS 310, it first passes through a CORBA access server 312 ("CA Server"), which acts as an entry point to NMS 310 and may control and filter messages that reach NMS 310. Although NMS 310 is shown in the figures herein as a single block or component for sake of simplicity, NMS 310 may comprise two or more software components operating independently and in coordination with each other. Thus, CA Server 312 acts as a gateway to these sets of software components that in conjunction constitute NMS 310.

Any changes in system components of system 300 may be automatically relayed to NMS 310 through notification listener 320 using a common interface language, such as CORBA. A "trigger" enables the system 300 to know that a change has been made within it. This trigger may be made inherent in the hardware. For example, a trigger may be a set of higher level self diagnostic rules defined by a manufacturer. Such a trigger may be initiated by an action such as a technician physically pulling an electronic card, or a controller card trying to communicate to a lesser card but failing to do so. When such a triggerable condition is detected, the hardware may communicate this information to its controlling EMS software system. Other types of triggers, for example, based on software that periodically checks for system components, are possible.

If the CA Server 312 or NMS 310 have become non-operational because, for example, either has crashed, then messages from notification listener 320 are unable to reach NMS 310. Hence, such messages may then be re-routed through communication pathway 351 to queue handler 350, which may store the messages and all future messages that are also unable to reach NMS, in the order received. Queued messages in the queue handler 351 remain stored in queue until both CA Server 312 and NMS 310 are again operational, and any such messages are then forwarded to NMS 310 through communication pathway 352.

Notification listener 320 may detect that CA Server 312 is non-operational through a number of different ways. For example, if CA Server 312 is non-operational, attempts to communicate with it using CORBA interface will give rise to an alert condition, which may be called an "exception" in technical terms. So while notification listener 320 tries to transmit a notification to CA Server 312, and such an attempt fails and initiates an alert condition, this is an indication that something is wrong with the communication with CA Server 312. At this point, a CORBA-provided checking mechanism may be used to determine whether CA Server 312 exists at all. Such an exemplary procedure may be used by a technician to determine whether CA Server 312 is functional. Other procedures are also possible.

Although the notification listener described in each of the above exemplary embodiments is a very useful tool in automatically determining any changes in an electronic system architecture in "real time", to effectively communicate with any of the downstream electronic components, an upstream NMS should maintain an accurate and up to the minute structural tree that is a true reflection of system components and their unique EMS class object references.

Figure 4:
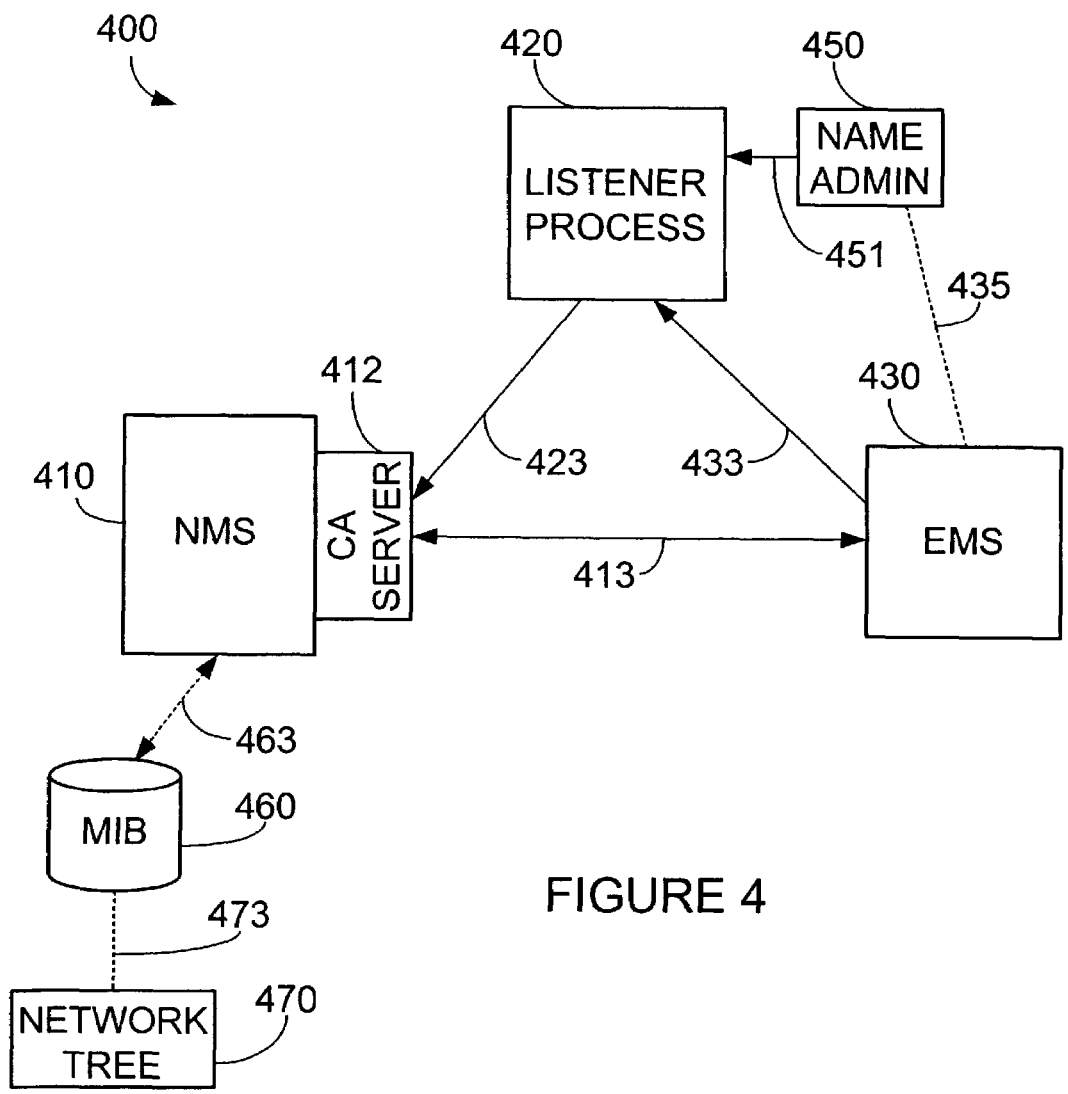
FIG. 4 shows an exemplary embodiment of a system or method according to the present invention that includes a tracking process that maintains an up to the minute system architecture of components within the system, including EMS class object references.

As shown in the exemplary embodiment of FIG. 4, a system 400 may have a notification listener 420, as described above, which may be in electronic communication with one or more EMS 430 through communication pathways 433. When EMS 430 or any component (not shown) within control of EMS 430 is upgraded or otherwise changed, a new EMS class object reference is created for the new EMS or system component. Such new EMS class object references are determined by a naming administrator 450 which may be part of a naming service. Naming administrator 450 is aware of new EMS class object references through communication pathway 435. Thus, naming administrator 450 may be aware of new EMS class object references relating to, for example, upgraded EMS within system 400, but an upstream NMS 410 may not be. So if upstream NMS 410 is not made aware of the new EMS class object reference, a command signal or a communication attempt by NMS 410 to EMS 430 or any of its components may not succeed.

Thus, the exemplary embodiment shown in FIG. 4 as system 400 is just one way of promoting a real time update of NMS 410 memory of any changes in EMS class object references by a constant and periodic inquiry of any such changes through a naming administrator 450. Other updating and maintaining processes of accurate EMS class object references are possible.

If, for example, EMS 430 is upgraded, then EMS class object references which identify all components under control of EMS 430 will change. If NMS 410 is not made aware of such changed EMS class object references, NMS 410 will not be able to effectively communicate with EMS 430 and components under EMS 430 control. Thus, an exemplary process of making NMS 410 aware of such changes as close to real time as possible would include several steps. Naming administrator 450 through communication pathway 435 should be aware of such an upgrade in EMS 430 and thus maintain an accurate EMS class object reference list for all components under EMS 430 control. Listener process, 420, which may include a notification listener, may periodically inquire and retrieve information from naming administrator 450 of any changes or upgrades in EMS class object references through communication pathway 451. If any changes in EMS class object references is detected, such information will be transmitted to NMS 410 so that NMS 410 may maintain an accurate account of all current EMS class object references relating to all components in system 400.

Listener process 420 may have to translate and re-package any information received from naming administrator 450 in order for NMS 410 to understand such information relating to changes in EMS class object references. After any necessary translation and re-packaging of received information from naming administrator 450 through communication pathway 451, listener process 420 transmits such information to NMS 410 through CA Server 412 via communication pathway 423.

NMS 410 may have a message information base 460 ("MIB") as an integral component or NMS 410 or MIB 460 may be a separate component in communication with NMS 410 through communication pathway 463. In either case, MIB 460 maintains a database of information received from listener process 420 through CA Server 412. Part of the database within MIB 460 is a mapping of an architecture of system 400 as is understood by NMS 410. Such mapping of the system architecture in MIB 460 may be, for example, a network tree 470 that keeps track of components in communication with and under control of NMS 410.

Figure 5A:
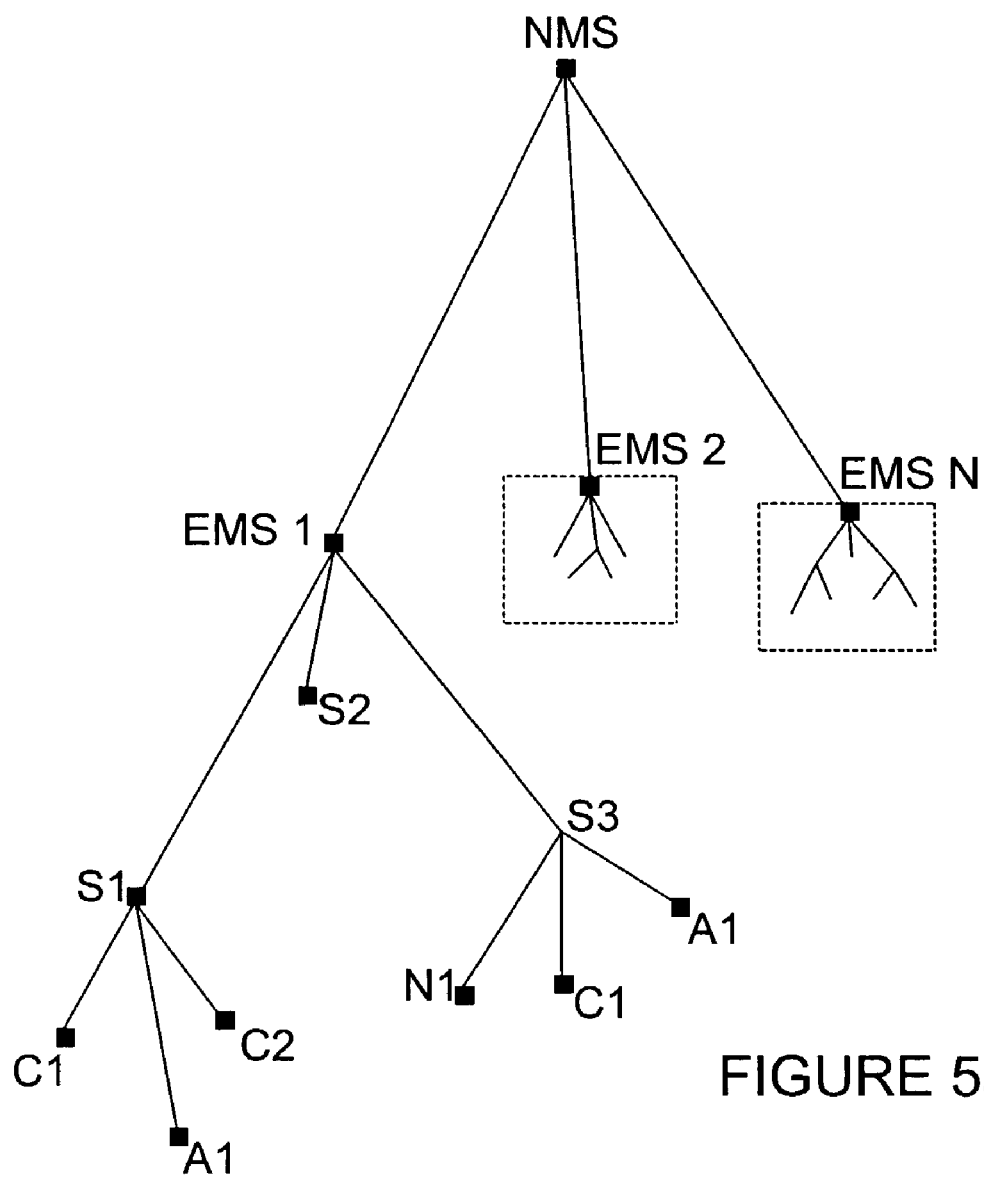
FIG. 5a shows an exemplary embodiment of a system tree that is maintained within an NMS and reflects the NMS information relating to EMS class object references relating to components within the system architecture.

An exemplary embodiment of a hypothetical network tree is shown in FIG. 5a. As shown in this figure, NMS is in communication with and control one or more EMS, depicted as EMS 1, EMS 2, and EMS N. Further, each EMS may be in communication with and control one or more switches, shown as S1, S2, S3. Each switch may further be in communication with and control one or more remote components, such as customers ("C"), nodes ("N"), or additional networks ("A"). Other remote components are possible. Only an exemplary tree path with labeled remote components for EMS 1 is shown in FIG. 5a for sake of simplicity, and exemplary tree paths for EMS 2 and EMS N are shown schematically. However, each EMS will have a tree path that reflects components within control of the given EMS. In any case, each component within any part of system 400 will be part of a network tree 470 that is at a particular point within the exemplary network tree shown in FIG. 5a. Because each such component has a unique position within the network tree, each is identifiable with a unique EMS class object reference.

Figure 5B:
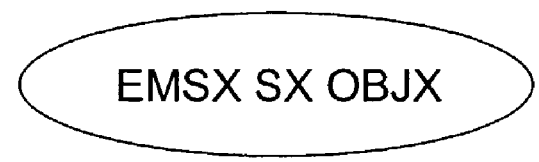
FIG. 5b shows an exemplary embodiment of an EMS class object reference that uniquely identifies a particular electronic component within a given electronic system architecture.

An exemplary EMS class object reference is shown in FIG. 5b. This EMS class object reference is only one way of identifying a particular component within an electronic architecture system. However, many other ways are possible. In the exemplary EMS class object reference shown as "EMSX SX OBJX", a first part of the identifier identifies the EMS that is in control of the electronic component. For example, a component under control of EMS 2 would have an EMS class object reference that identifies EMS2 within it. A second part of the identifier identifies the switch that is in control of the electronic component. For example, a component under control of S3 would have an EMS class object reference that identifies S3 within it. A third part of the identifier identifies other objects that are in control of the electronic component. For example, a component under control of A1 would have an EMS class object reference that identifies A1 within it, and so on.

Alternatively, a more straightforward EMS class object reference classification may be used that includes, for example, two or more identifiers. A first identifier would indicate the basic type of component that is being identified. A second identifier would identify particular root that may be used to locate the component. Additional identifiers may identify other characteristics of the component or provide additional information to EMS in determining the location of the component.

Although a few types of exemplary EMS class object references for given electronic components are discussed herein, many ways of identifying such components are possible. A focus of the systems and methods of the present invention is to keep track of EMS class object references in real time using a tracking process, such as the exemplary embodiment of system 400 shown in FIG. 4. Alternatively, all such updates may be made manually without automated control. When EMS 430 is upgraded, its EMS class object references will be changed, and such updated information is maintained in naming administrator 450. Listener process 420 periodically and/or automatically retrieves such information from naming administrator 450 and re-packages the information, if necessary, in order for NMS 410 to understand the information, and transmits the information on to NMS 410. Such new information is then reflected in and changes the network tree 470 memory in MIB 460 within NMS 410. Thus, with such new EMS class object references in its memory, NMS 410 may effectively communicate with components under control of EMS 430 through communication pathway 413, which may be a synchronous communication pathway, and such components would reflect information back to NMS 410 through communication pathway 413.

The exemplary systems and methods described above according to the present invention have many advantages. One such advantage is the automated nature of maintaining an accurate network tree architecture in NMS. Whenever a downstream change is made in an electronic architecture under the control of a specific NMS, the system enables that NMS to become aware of the change in the architecture through a notification signal derived from the point of change in the architecture. In other words, the specific area that receives a change in status notifies its controlling NMS upstream that the change has been made and that the NMS should make note of such a change in its cumulative architecture of the entire system. Further, any upgrades or changes in components, such as an upgraded EMS, would result in new EMS class object references in components under such an EMS, thereby triggering a series of steps that result in NMS becoming aware of the new EMS class object references. Such "asynchronous" notification signals are constantly being transmitted upstream through durable and efficient CORBA lines that enable fast object-oriented communication between components and machines in the communication lines between the point of change and the desired upstream NMS. The automated EMS class object reference tracker promotes the proper operation of the system in real time and may serve to automatically prevent any downtime in a given electronic system by decreasing chances of an NMS not being able to command or communicate with downstream components.

Using the exemplary systems and methods described herein, the proper architecture reflecting NMS control may be automatically kept updated in real time when an NMS system is automatically notified of signals downstream that communicate changes in, for example, network creation/deletion notifications, configuration changes of ADSL network equipment, fault and alarms of network equipment, and other signals that an NMS system should be aware of. In response to such signals, NMS may make note of such changes and change the architecture of the entire network within its memory, reply with its own commands, or notify a programmer that such changes have been made, thereby letting the programmer be aware of changes that may need immediate attention, such as, for example, network failure.

In describing representative embodiments of the invention, the specification may have presented the method and/or process of the invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the invention should not be limited to the performance of their steps in the order written, and one skilled in the art can readily appreciate that the sequences may be varied and still remain within the spirit and scope of the invention.

The foregoing disclosure of the embodiments of the invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

We claim:

1. A system for maintaining a real time mapping of an electronic system architecture within a Network Management System (NMS) database, the system comprising:
   An electronic component within an electronic architecture with a given identifier, the electronic hardware component having been modified reflecting a new identifier;
   a naming administrator that receives a notification of the new identifier;
   a listener device that periodically requests and automatically receives information relating to the new identifier from the naming administrator, wherein the listener device also receives notification information from an electronic hardware component and translates it into a CORBA format, wherein the receiving and translating by the listener device occur in real time;
   an NMS in communication with the listener device and which receives the information relating to the new identifier and stores such information within a database that is a mapping of the electronic architecture; and
   a plurality of Element Management Systems, each in communication with the listener device, and wherein each Element Management System (EMS) has its own unique identifier, and wherein each electronic hardware component in the electronic architecture is under control of a given EMS and has an identifier that identifies that controlling EMS.

2. The system of claim 1, wherein the new identifier reflects a unique position within a tree network of the system architecture in the database of the NMS.

3. The system of claim 2, wherein the new identifier identifies the controlling EMS that controls its given electronic hardware component.

4. The system of claim 1, wherein communication pathways between electronic hardware components utilize a universally understandable format based on an object-oriented language.

5. The system of claim 4, wherein the universally understandable format is CORBA interface.

6. A system for maintaining a mapping of an electronic architecture under control of a Network Management System (NMS) in a database memory of the NMS, the system comprising:
   An electronic hardware component incorporating an associated firmware module under control of an Element Management System (EMS), the electronic hardware component having a unique identifier;
   a naming administrator in communication with the EMS, wherein the naming administrator is updated with any changes in the unique identifier;
   a listener device that receives information from the naming administrator relating to any changes in the unique identifier, wherein the listener device translates the information into a format that is understandable by an NMS and is one of at least RPC, RMI, CORBA and COM, wherein the receiving and translating by the listener device occur in real time;
   an NMS that receives translated information from the listener device relating to changes in the unique identifier of the component, and reflects such changes in its information database; and
   a plurality of EMS, each in communication with the listener device, and wherein each EMS has its own unique identifier, and wherein each component in the electronic architecture is under control of a given EMS and has an identifier that identifies that controlling EMS.

7. The system of claim 6, wherein the new identifier reflects a unique position within a tree network of the system architecture in the database of the NMS.

8. The system of claim 7, wherein the new identifier identifies the controlling EMS that controls its given electronic hardware component.

9. The system of claim 6, wherein communication pathways between electronic hardware components utilize a universally understandable format based on an object-oriented language.

10. The system of claim 9, wherein the universally understandable format is CORBA interface.

11. A system for maintaining a mapping of an electronic architecture under control of a Network Management System (NMS) in a database memory of the NMS, the system comprising:
   a hardware component under control of an Element Management System (EMS), the hardware component having a unique identifier;
   means for naming in asynchronous communication with the EMS, wherein the means for naming is updated with any changes in the unique identifier;
   means for listening that receives information from the means for naming relating to any changes in the unique identifier, wherein the means for listening translates the information into a format that is understandable by an NMS, wherein receiving and translating by the means for listening occur in real time;
   an NMS that receives translated information asynchronously from the means for listening relating to changes in the unique identifier of the hardware component, and reflects such changes in its information database; and
   a plurality of EMS, each in communication with the means for listening, and wherein each EMS has its own unique identifier, and wherein each component in the electronic architecture is under control of a given EMS and has an identifier that identifies that controlling EMS.

12. The system of claim 11, wherein the new identifier reflects a unique position within a tree network of the system architecture in the database of the NMS.

13. The system of claim 12, wherein the new identifier identifies the controlling EMS that controls its given hardware component.

14. The system of claim 11, wherein communication pathways between system hardware components utilize a universally understandable format based on an object-oriented language.

15. The system of claim 14, wherein the universally understandable format is CORBA interface.

* * * * *